(12) United States Patent
Freund et al.

(10) Patent No.: US 11,905,436 B2
(45) Date of Patent: Feb. 20, 2024

(54) PAINT COMPOSITION AND FILLER FOR SUCH A PAINT COMPOSITION

(71) Applicant: Gebrüder Dorfner GmbH & Co. Kaolin- und Kristallquarzsand-Werke KG, Hirschau (DE)

(72) Inventors: Klaus-Jürgen Freund, Much (DE); Oliver Kaltenecker, Stulln (DE); Reinhard Kräuter, Sulzbach-Rosenberg (DE)

(73) Assignee: GEBRÜDER DORPNER GMBH & CO. KAOLIN-UND KRISTALLQUARZSAND-WERKE KG, Hirschau (DE)

( * ) Notice: Subject to any disclaimer, the term of this patent is extended or adjusted under 35 U.S.C. 154(b) by 329 days.

(21) Appl. No.: 16/674,499

(22) Filed: Nov. 5, 2019

(65) Prior Publication Data

US 2020/0140700 A1  May 7, 2020

(30) Foreign Application Priority Data

Nov. 6, 2018 (EP) ..................................... 18204639

(51) Int. Cl.
| | |
|---|---|
| *C09D 7/61* | (2018.01) |
| *C04B 33/04* | (2006.01) |
| *C04B 33/13* | (2006.01) |
| *C04B 35/185* | (2006.01) |
| *C09D 7/40* | (2018.01) |

(52) U.S. Cl.
CPC ................ *C09D 7/61* (2018.01); *C04B 33/04* (2013.01); *C04B 33/131* (2013.01);
(Continued)

(58) Field of Classification Search
CPC .............. C01P 2004/61; C01P 2004/03; C01P 2004/51; C01P 2006/10; C01P 2006/19;
(Continued)

(56) References Cited

U.S. PATENT DOCUMENTS

| | | |
|---|---|---|
| 2002/0115556 A1 | 8/2002 | Stockwell et al. |
| 2012/0227629 A1 | 9/2012 | Folmar et al. |
| 2013/0045384 A1 | 2/2013 | Khokhani et al. |
| 2014/0371053 A1 | 12/2014 | Sigman et al. |
| 2019/0010333 A1* | 1/2019 | Kamau ................ C09D 133/04 |

FOREIGN PATENT DOCUMENTS

WO    WO 00/31190    6/2000

OTHER PUBLICATIONS

Official Action with machine translation for European Patent Application No. 18204639.1, dated May 28, 2021, 7 pages.
(Continued)

*Primary Examiner* — Shuangyi Abu Ali
(74) *Attorney, Agent, or Firm* — SHERIDAN ROSS P.C.

(57) ABSTRACT

The present invention relates to a filler for a paint composition, wherein the filler comprises a calcinate having particles with an average particle size ($d_{50}$, SediGraph III) in the range between 3 μm and 50 μm and a mullite content of 30-70 measured as mullite index. The invention is characterised in that the bulk density of the filler is >450 g/L. The invention also relates to a paint composition characterised in that it comprises a filler which has a bulk density >450 g/L and comprises a calcinate which has particles with a mean particle size ($d_{50}$, SediGraph III) in the range between 3 μm and 50 μm and a mullite content of 30-70 measured as mullite index. Furthermore, the invention relates to uses of such a filler for the preparation of a paint composition.

13 Claims, 3 Drawing Sheets

(52) U.S. Cl.
CPC .............. *C04B 35/185* (2013.01); *C09D 7/69*
(2018.01); *C04B 2235/349* (2013.01); *C04B
2235/3463* (2013.01); *C04B 2235/77*
(2013.01); *C04B 2235/95* (2013.01)

(58) Field of Classification Search
CPC ...... C04B 2235/3463; C04B 2235/349; C04B
2235/77; C04B 2235/95; C04B 33/04;
C04B 33/131; C04B 35/185; C08K
11/005; C08K 2201/003; C08K 2201/006;
C08K 3/34; C09C 1/42; C09D 7/61;
C09D 7/69
See application file for complete search history.

(56) References Cited

OTHER PUBLICATIONS

Official Action for European Patent Application No. 18204639.1, dated Jul. 7, 2020, 6 pages.
Extended Search Report for European Patent Application No. 18204639.1, dated Feb. 27, 2019, 3 pages.
Official Action for Canada Patent Application No. 3117834, dated Jun. 27, 2022, 3 pages.
Official Action for Australia Patent Application No. 2019376799, dated Dec. 18, 2021, 4 pages.
Official Action for Canada Patent Application No. 3117834, dated Jan. 25, 2023, 3 pages.

\* cited by examiner

PAINT COMPOSITION AND FILLER FOR SUCH A PAINT COMPOSITION

CROSS-REFERENCE TO RELATED APPLICATION

This application claims the benefit of European Patent Application No. EP 18 204 639.1 filed Nov. 6, 2018, the entire contents of which are incorporated herein by reference.

FIELD

The invention relates to a filler for a paint composition and to a paint composition containing such a filler. Furthermore, the invention relates to a use of such a filler for the preparation of a paint composition.

BACKGROUND

From the prior art, different paint compositions are known. These usually include solvents and binders, fillers, pigments and various additives. The pigments are decisive for the colour impression of the respective composition, wherein a distinction is made between inorganic and organic pigments. Inorganic white pigments of titanium dioxide are widely used because of their high scattering power and good hiding power, but they have the disadvantage of being very expensive. These fillers are added on the one hand to reduce costs and on the other hand to achieve desired optical and mechanical properties of the paint composition. Common fillers include magnesium silicate, calcium carbonate, aluminium hydroxide, aluminium silicate, silica and diatomaceous earth.

Among the aluminium silicate fillers, kaolin has especially distinguished itself for its matting properties for interior and facade paints, the main component of which is kaolinite. By calcination at elevated temperature, first a dehydration takes place at temperatures between 500 and 600° C. and the formation of so-called amorphous metakaolin, which in turn undergoes a phase transition to an aluminium-silicon spinel at temperatures between 900 and 950° C. Calcination above 1050° C. results in the conversion of the spinel phase by silica cleavage to mullite.

For example, EP 2 744 863 B1 shows that a high mullite content in calcined kaolin particles leads to an increase in the Mohs hardness of the particles. In combination with a very narrow particle size of only $d_{50}$=2-7 μm, the abrasion and polishing resistance as well as the opacity of the paint composition could be improved with these particles when used as a filler.

SUMMARY

It is the object of the present invention to provide a filler for a paint composition which is not subject to the limits known from the prior art with regard to the usable particle size range and nevertheless can bring about increased abrasion and polishing resistance as well as increased opacity of the paint composition. Furthermore, the invention is directed to a paint composition comprising such a filler and a use of such a filler.

This object is achieved by a filler for a paint composition as set forth herein.

A substantial aspect of the invention is a filler for a paint composition, wherein the filler comprises a calcinate, which has particles of an average particle size ($d_{50}$, SediGraph III) in the range between 3 μm and 50 μm and a mullite content of 30-70 measured as mullite index characterised in that the bulk density of the filler is >450 g/L.

The term "filler" in the following refers to a universally mixable substance, which is preferably present in the solid state. Preferably, the filler is a powder or else a free-flowing substance, similar to a sand. The filler contains the particles.

The term "calcinate" is to be understood in the following in a particularly preferred embodiment as "calcined kaolin".

The calcinate used as a filler is characterised by a high mullite content of 30-70, which is measured as mullite index (M.I.). The determination of the M.I. of a material to be examined is carried out by means of quantitative X-ray diffractometry (XRD). Peak intensities of certain peaks from the diffraction image, which are assigned to the mullite, are compared with the peak intensities of the corresponding peaks in the X-ray diffractogram of samples having a known mullite content. A mullite index of 30-70 corresponds approximately to a mullite content of 30-70%, whereby the M.I. does not reflect the exact content in percent, as a required absorption correction and/or twin analysis is usually not carried out.

The high mullite content of 30-70, measured as mullite index, of the calcinate particles leads to a significantly higher Mohs hardness of the particles in a range between 5.5 and 6.5 compared to a Mohs hardness of 3.5-5 for calcinate particles known from the prior art which have a lower mullite content. The higher Mohs hardness of the particles of the filler can result in improved abrasion resistance of the paint composition made therefrom, as shown in EP 2 744 863 B1.

Furthermore, the particles of the calcinate are characterised by an average particle size ($d_{50}$, SediGraph III) in the wide range between 3 μm and 50 μm. In contrast to the prior art, which provides for a much smaller range for the average particle size, thus no complicated preparation or separation processes are necessary. This allows a more cost-effective and time-saving production of the filler.

In addition to the above-mentioned broad average particle size range between 3 μm and 50 μm, the high bulk density of >450 g/L could also be identified as substantial for the present invention. The increased bulk density allows for a larger proportion of particles per unit volume, not only in a bulk of particles but also, for example, in a paint composition. Due to the preferred comparatively high hardness of the particles, improved abrasion resistance can thus be achieved.

The higher bulk density can be achieved by various, possibly also complementary measures. For example, compared to prior art particles, the bulk density could result from the greater variance in particle size, wherein smaller particles are able to fill voids formed by larger particles. As a result, an overall denser packing and thus higher bulk density would be achievable.

Alternatively or additionally, the higher bulk density could also be possible by a suitable adjustment of the geometry of the particles. In particular, it would be possible in this regard to provide particles with flat surface areas which are larger than those of the prior art. For example, according to EP 2 744 863 B1, a calcination is provided in the fluidized bed process, which usually leads to a substantially droplet-like shape of the primary particles and thus also to an uneven (e.g. hilly) surface of agglomerates formed therefrom. Due to this surface shape, the direct surface contact of adjacent particles or agglomerates is not possible. On the contrary, adjacent particles touch exclusively in the region of the elevations (hill tops) with formation of spaces not occupied by particles but, for example, by air or in a paint composition by solvents or binders.

In the bulk of fillers according to the invention or of calcinate with the defined particles, the particles can be arranged at a smaller distance from one another, from which the high bulk density, which is essential to the invention, can result. As a result of this high bulk density, the filler particles may also be less spaced in a paint composition applied to a surface and provide advantageously higher abrasion resistance and matting of the filler or paint composition.

It has proved to be preferred if the particles of the calcinate have an average particle size ($d_{50}$, SediGraph III) in the range between 5 μm and 60 μm, preferably in the range between 7 μm and 50 μm, particularly preferably in the range between 8 μm and 40 μm. This is the mean particle size. However, this can be composed of mixtures of particles of different average particle sizes as described above. For example, particles from a band of larger average particle size could be mixed with particles from a band of lower average particle size in a predetermined ratio. For example, the particles consist of first particles from a band of larger average particle size (15 μm<$d_{50}$<100 μm, preferably 20 μm<$d_{50}$<60 μm, more preferably 25 μm<$d_{50}$<40 μm) and second particles from a band of lower average particle size (30 μm>$d_{50}$>2 μm, preferably 20 μm>$d_{50}$>3 μm, more preferably 17 μm>$d_{50}$>5 μm, more preferably 15 μm>$d_{50}$>7 μm).

According to a preferred embodiment, the filler has a bulk density>500 g/L, preferably >550 g/L, more preferably >600 g/L and particularly preferably in the range of 620-680 g/L. It has been found that a high bulk density due to the dense packing of the filler particles is particularly advantageous and that an improved abrasion resistance can be achieved.

The measured bulk densities in g/L of the filler according to the invention and the comparative products H, V, C, M and fine calcinates in general are shown in Table 1.

TABLE 1

| | Bulk density [g/L] |
| --- | --- |
| Inventive filler | >450 |
| Comparative product H | ~350 |
| Comparative product V | ≤450 |
| Comparative product C | ~260 |
| Comparative product M | ≤450 |
| Fine calcinate | <300 |

It can be seen from the measurement results shown in Table 1 that the filler according to the invention has a significantly higher bulk density than similar comparative products on the market.

It is preferred that the filler has an oil absorption according to DIN EN ISO 787-5:1995-10 of <50 g/100 g, preferably of <40 g/100 g and particularly preferably of <30 g/100 g. The determination of the oil absorption according to DIN EN ISO 787-5:1995-10 is a general test procedure for pigments and fillers. The oil absorption indicates the amount of oil required for a defined amount of a filler, in the form of a powder, to obtain a non-refractive paste. The indication of the oil absorption is usually in g required oil/100 g filler. Linseed oil is usually used as the oil. From a low oil absorption, it is usually possible to deduce that the filler has a good dispersibility in a binder and thus larger amounts of filler can be used with less binder requirement in paint compositions. By reducing the need for expensive binders, the price of a paint composition can be reduced by the filler.

One variable that can be achieved by setting a low oil absorption is to improve the wettability of the filler particles by the oil. This can be influenced for example by favourable surface materials, advantageous surface geometries and/or favourable surface-to-volume ratios. In the present case, it is preferred that the surface geometries and/or favourable surface-to-volume ratios are selected such that the low absorption as defined above can be achieved. A particularly beneficial effect on the oil absorption can be achieved by having flat surface portions along which adjacent particles can slide along one another on an extremely thin film of oil. Compared to uneven surfaces, the oil requirement for filling surface depressions to allow comparable sliding is reduced.

According to an advantageous embodiment at least 50%, preferably at least 75%, more preferably at least 80% and particularly preferably at least 90% of the particles of the calcinate has an angular morphology and/or at least one planar surface, with the proportion of the associated side surface of the respective particles being at least 25%, preferably at least 30%, more preferably at least 40%, particularly preferably at least 50%. This morphology of the particles of the calcinate can be ensured in a particularly simple and preferred manner such that the particles can be tightly packed due to the edges and the flat surfaces and can thus reach the high bulk density described above and/or the flat surfaces can slide better against each other such that a small amount of binder is needed to ensure good flowability.

In contrast to fillers known from the prior art, produced in the fluidized bed process according to EP 2 744 863 B1, which also include a calcinate with a high mullite content and—as shown in FIG. 2a-c—mostly particles having rounded corners and edges and uneven surfaces, the calcinate particles according to a preferred embodiment of the present invention show a much edgier morphology and far more flat surfaces. This ensures a higher bulk density of the filler due to the better packability of the particles and a lower binder requirement when used in a paint composition, since the particles having flat surfaces slide better against each other and less binder is absorbed in bumps, troughs and/or holes in the surface. Thus, in such particles also a very good wettability with the binder is provided, as said binder can flow even at low volumes used on the flat surfaces and preferably can completely enclose the particles.

Furthermore, the invention is directed to a paint composition comprising a filler having a bulk density of >450 g/L and a calcinate comprising particles having a mean particle size ($d_{50}$, SediGraph III) in the range between 3 μm and 50 μm and a mullite content of 30-70 measured as mullite index.

The paint composition is preferably an emulsion paint intended for use on interior and/or exterior walls (e.g., facade walls). The high mullite content of the calcinate particles contributes to them having a high Mohs hardness, which in turn has a positive influence on the high abrasion resistance and/or cleanability of the paint composition.

From the prior art (e.g. EP 2 744 863 B1), paint compositions are known which contain fillers of calcite particles having a high mullite content. Contrary to this prior art, however, it has been possible within the scope of this invention to show that the increased abrasion resistance is not limited to the particle size in the range from 2 to 7 μm of the particles, which was hitherto considered substantial. Rather, it could be shown by the filler according to the invention that by particles covering a much larger range for the particle size, an at least similar effect can be achieved. Depending on the morphology of the particles, the effect known from the prior art can even be exceeded. This occurs, for example, in a paint composition after it has been applied to a surface in the case of particles which are close to one another or on top of one another, wherein preferably at least one fraction of the particles has a closely packable, for example a substantially platelet-shaped geometry.

If particles of different particle size are used, this can be further advantageous for the high bulk density of the filler according to the invention, since smaller particles can occupy voids between larger particles and a volume can be filled more effectively. Thus, in the paint composition, the particles may come closer to one another and a surface treated with paint composition is covered more densely with the filler particles contained therein, for example, with the same application volume of the paint composition. As a result, paint compositions having a higher abrasion resistance, a better cleanability and/or a desired matting can be realized.

In a further preferred embodiment, the paint composition comprises a filler according to any of claims 1 to 5.

Preferably, a paint composition as defined above according to DIN EN 13300:2002-11 is assigned to at least class 3 or better, preferably class 2 or better, in terms of abrasion resistance. According to DIN EN 13300:2002-11, the paint composition is classified into classes with regard to wet abrasion resistance, the classes being based on the abrasion in μm for a defined number of abrasion cycles or strokes. Class 1 indicates the highest resistance with an abrasion of <5 μm at 200 abrasion cycles. The classes 2 and 3 show an abrasion of 5 μm and <20 μm or 20 μm and <70 μm in 200 abrasion cycles.

More preferably, the paint composition comprises at least one further substance selected from a group comprising solvents, binders, pigments and additives. The solvent contained may be water and/or an organic solvent. Regardless of the other ingredients, the binders in the paint composition may comprise, but are not limited to, alkyd resins, epoxy resins, polyurethanes, silicone resins, phenolic resins, epoxy esters, polyester resins, polyamide resins, vinyl ester resins, polyacrylates, gum arabic, and/or casein. Independent of the other constituents, the pigments may comprise one or more inorganic and/or organic pigments, which may be either white, black and/or coloured pigments.

The above-mentioned at least one additive is preferably selected from a group comprising thickeners, wetting agents, dispersants, stabilizers, preservatives, defoamers, biocides, marble flour and chalk. By suitable selection of one or more of these additives, for example, flowability, storage stability, rheological behaviour, haptics, reflectivity, wettability of various substrates, risk of algae growth on the surface coated with the paint composition and other properties of the paint composition can be advantageously adjusted.

A variant of the paint composition is characterised in that it has a pigment volume concentration (PVK) in the range between 40 and 90, preferably in the range between 50 and 80. The pigment volume concentration (PVK) indicates the volume ratio between pigments and/or fillers and the binder in the cured paint composition, i.e., the higher the PVK value, the lower the binder content present. The proportion or the volume of binder in the paint composition can be chosen to be very low in relation to the filler due to the above features of the filler particles.

It is preferred that the paint composition has a wet abrasion resistance according to DIN EN ISO 11998:2006-10 of <45 μm abrasion/200 abrasion cycles, preferably of <30 μm abrasion/200 abrasion cycles, more preferably of <20 μm abrasion/200 abrasion cycles and particularly preferably 10-15 μm, for example, about 12±1 μm abrasion/200 abrasion cycles. The low abrasion of the paint composition ensures a high resistance of the coating on a surface, which can retard re-application of the paint composition and thus reduce costs.

It is further preferred that the paint composition has an abrasion resistance according to ASTM D2486-17 of >1000 cycles, preferably >2000 cycles, more preferably >3000 cycles, more preferably 3500-4500 cycles and most preferably 3800-4200 cycles. The number of cycles indicates how many cycles are required until first points of abrasion on a test area are discernible. The high abrasion resistance of the paint composition offers, as already mentioned, the advantage that it rarely has to be renewed and the underlying surface is protected against mechanical stress.

It has been found to be particularly preferable if the paint composition has a cleaning ability according to ASTM D4828-94 (2016) of more than 100 points, preferably of more than 103 points, more preferably of more than 108 points and particularly preferably of at least 109 points. The good cleaning ability allows a largely residue-free removal of soiling without much effort. This is a key advantage especially for facade walls due to malicious soiling, such as graffiti, because the facade coating can be easily cleaned and does not need to be renewed.

Another essential aspect of the invention is the use of the filler according to the invention for the preparation of a paint composition.

A variant of the use is characterised by the fact that the paint composition according to DIN EN 13300:2002-11 is assigned to at least class 3 or better, preferably class 2 or better, in terms of abrasion resistance.

Table 2 shows an exemplary formulation for a paint composition comprising the filler of the invention.

TABLE 2

| Premium interior wall paint with PVK 50 | |
|---|---|
| | Ma-% |
| Water | 25.2 |
| Thickener | 2.7 |
| Wetting agent | 1.0 |
| Defoamers | 0.2 |
| $TiO_2$ | 19.0 |
| Filler | 21.5 |
| Defoamers | 0.2 |
| Acrylate dispersion | 30.0 |
| Biocide | 0.2 |

Table 3 shows a further exemplary formulation for a paint composition comprising the filler of the invention.

TABLE 3

| Interior wall paint medium quality with PVK 80 | |
|---|---|
| | Ma-% |
| Water | 29.9 |
| Thickener | 0.5 |
| Wetting agent | 10.4 |
| Defoamers | 0.2 |
| $TiO_2$ | 6.0 |
| Marble powder | 38.0 |
| Filler | 16.5 |
| Biocide | 0.3 |
| Defoamers | 0.2 |
| Printing polymer | 8.0 |

A comparison of the wet abrasion resistance, cleanability, and average particle size measurement results for the exemplary embodiments of a paint compositions according to the present invention ("Paint Composition E") of Table 2 or 3, and of paint compositions on the market using Comparative Fillers H ("Paint Composition H") or M ("Paint Composition M") is shown in Table 4.

TABLE 4

|  | Paint composition H | Paint composition M | Paint composition E | PVK |
|---|---|---|---|---|
| Wet abrasion resistance (DIN EN ISO 11998: 2006-10) | 42 µm Abrasion | 45 µm Abrasion | 12 µm abrasion | 80 |
| Wet abrasion resistance (ASTM D2486-17) | about 1000 cycles | about 1000 cycles | about 4000 cycles | 50 |
| Cleanability (ASTM D4828-94-(2016)) | 100 | not known | 109 | 50 |
| $d_{50}$ (SediGraph III) | about 5 µm | about 4 µm | about 5 µm |  |

As can be seen from Table 4, the paint composition of the present invention provides a significantly increased wet abrasion resistance compared to the products tested on the market. The described filler provides a much improved resistance and cleanability than prior art fillers due to the features described above.

BRIEF DESCRIPTION OF THE DRAWINGS

Further advantages and embodiments of the invention will be explained with reference to the following figures and examples.

In the drawings.

DETAILED DESCRIPTION

Figure 1A:
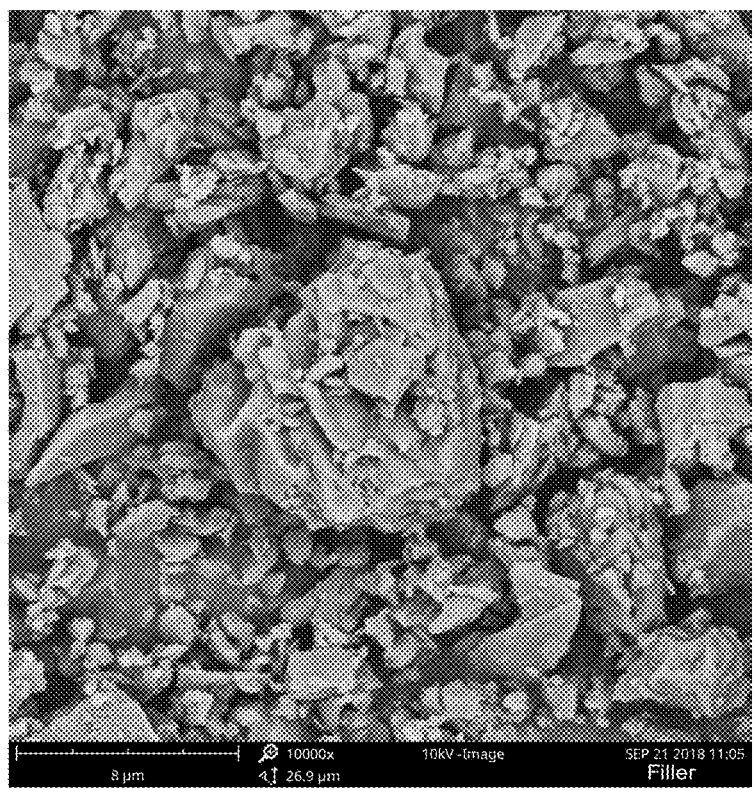
FIG. 1*a-c* shows scanning electron micrograph images of filler particles described above.
Figure 1B:
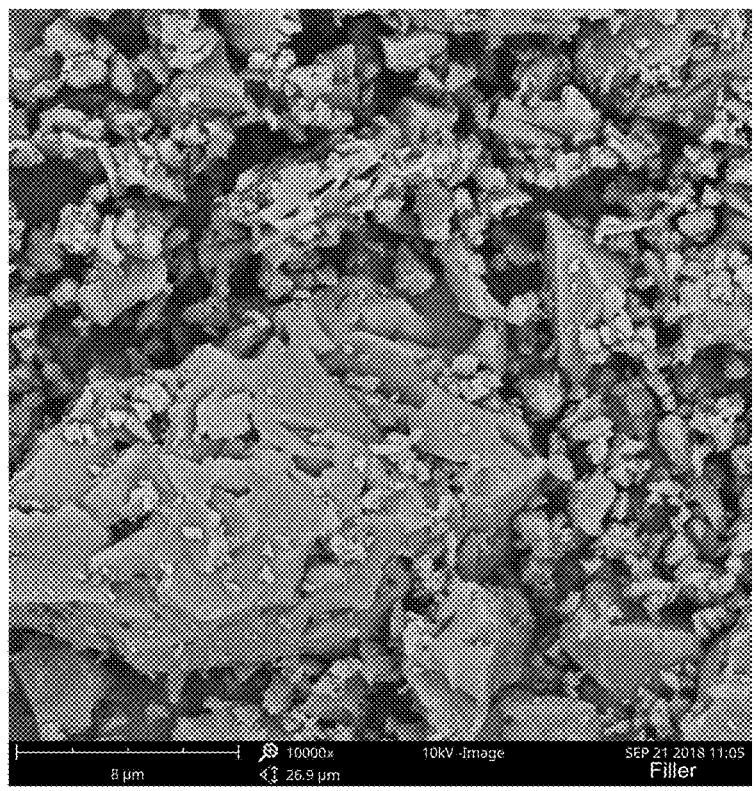
Figure 1C:
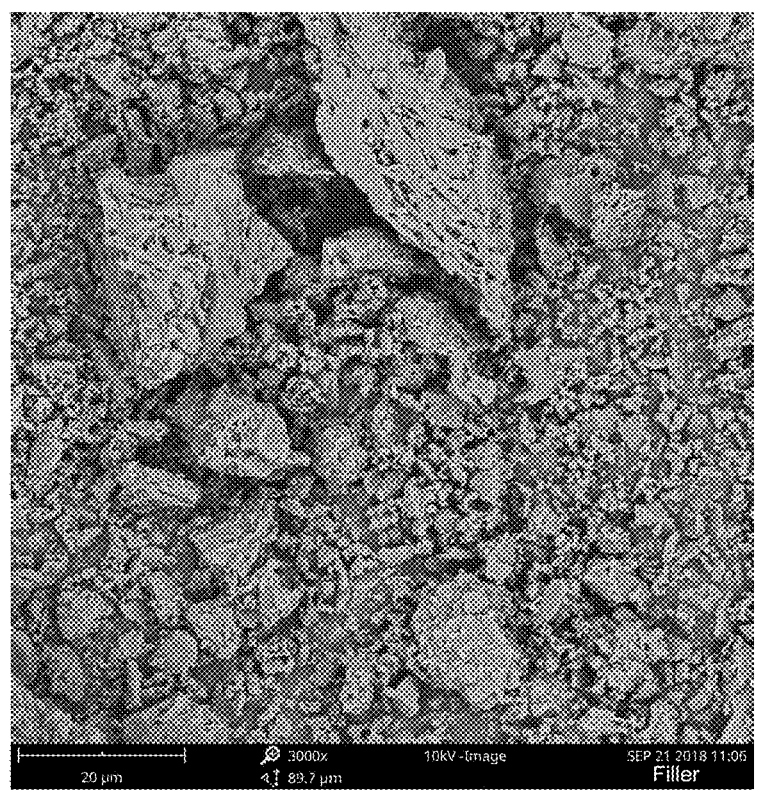

FIGS. 1*a-c* each show scanning electron microscope (SEM) images of filler particles according to an advantageous embodiment of this invention. FIGS. 1*a* and 1*b* show different sections of the surface on which the particles are applied at 10,000× magnification. FIG. 1*c*, however, shows a section of the surface, which is shown at 3000× magnification.

As can be seen on the SEM images in FIGS. 1*a-c*, the particles of the filler essentially have an angular morphology, wherein hardly any rounded corners or edges are formed. In addition, the particles have a high proportion of planar surfaces, each of which accounts for a majority of the respective side surfaces of the particle. It can also be seen that the particle size of the particles clearly differs and results from the wide range of the mean particle size. This could contribute to the filler having a high bulk density, since the different sized angular particles with the many flat surfaces could be packed very tightly and could effectively utilize the available volume. In addition, the described morphology of the filler shown ensures good wettability with a binder, which is reflected by the low oil absorption of the particles. In connection with FIGS. 1*a-c*, it is pointed out that in each case a loose layer was used for the SEM images to illustrate the particles, and the arrangement of the particles relative to one another may deviate from the arrangement in the densest possible packing.

As a comparison to the embodiment according to the present invention shown in FIGS. 1*a-c*, FIGS. 2*a-c* show SEM images of a filler on the market (comparative product M). This product is also calcinate particles containing a high mullite content. It can be seen that the filler particles have substantially rounded corners and edges and have virtually no flat surfaces. The recognizable surfaces essentially show a high degree of unevenness. Furthermore, the particles have a small average particle size and also the particle size band in which the particle sizes are located is narrower, which is why all particles show substantially very similar particle sizes.

Figure 2A:
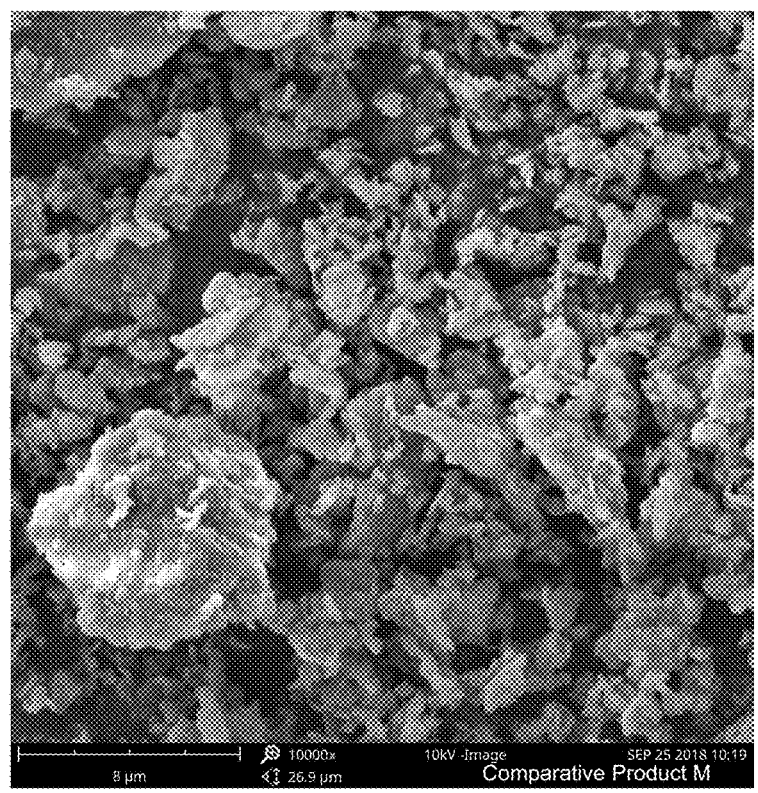
FIG. 2*a-c* shows scanning electron micrograph images of filler particles of a comparison product on the market.
Figure 2B:
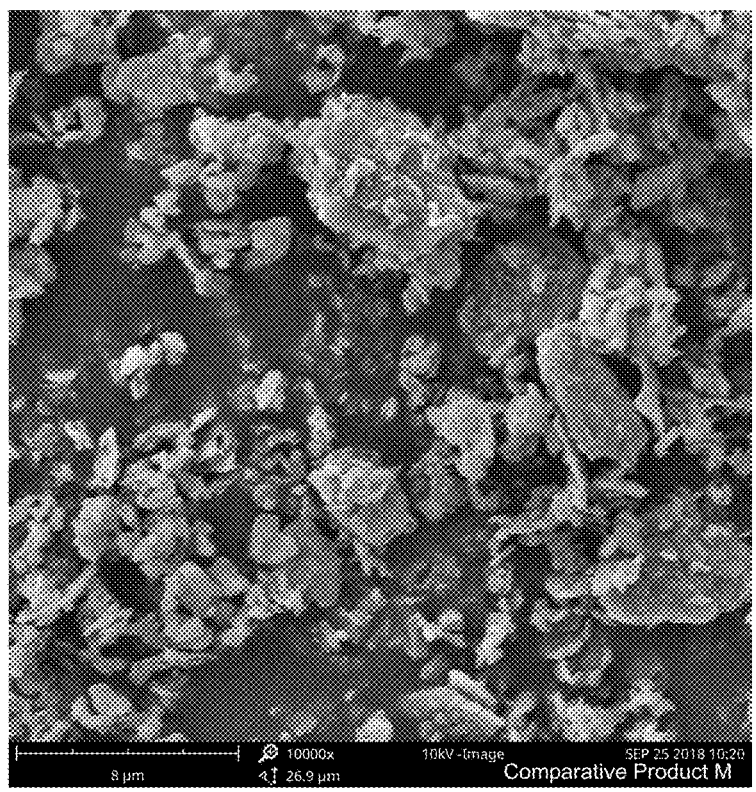
Figure 2C:
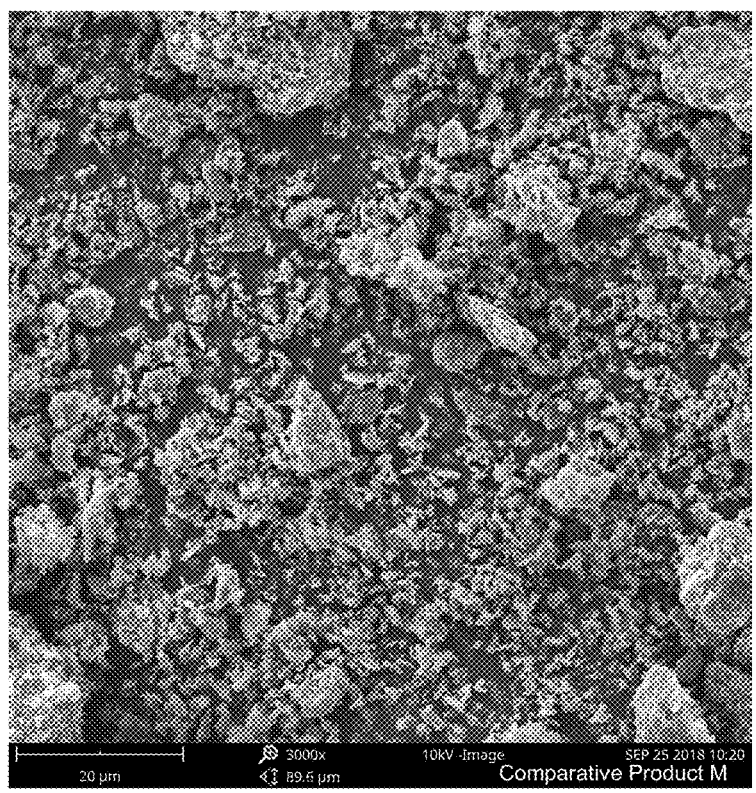

The substantially drop-shape or rice-grain-like shape of the particles of the comparative product shown in FIGS. 2*a-c* indicates that the calcination was carried out in the fluidized bed process. Larger particles appear to be agglomerates of smaller drop- or rice grain-shaped particles.

In the exemplary embodiment shown, the high bulk density or the high filler content achievable in the bulk of the filler as well as in the paint composition can be explained in particular by the different morphology and the broader particle size distribution in comparison to the commercially available filler particles (see FIGS. 2*a-c*). In combination with the high mullite content, fillers according to the present invention can achieve the above-described advantageous properties over the prior art.

The applicant reserves the right to claim all the features disclosed in the application documents as essential to the invention, provided that these are novel individually or in combination over the prior art. It is further pointed out that features which in themselves can be advantageous have also been described in the individual drawings. A person skilled in the art will immediately recognize that a particular feature described in one drawing can also be advantageous without adopting further features from this drawing. Furthermore, a person skilled in the art will recognize that advantages can also result from a combination of a plurality of features shown in individual or in different drawings.

What is claimed is:

1. A filler for a paint composition, the filler comprising:
    a calcinate having particles with an average particle size ($d_{50}$, SediGraph III) in a range between 3 micrometers and 50 micrometers; and
    a mullite content of 30-70 measured as a mullite index,
    wherein a bulk density of the filler is greater than 600 grams per liter, wherein at least 50% of the particles of the calcinate have at least one flat surface, and wherein the proportion of an associated side surface of the respective particle is at least 25%.

2. The filler according to claim 1, wherein the particles of the calcinate have an average particle size ($d_{50}$, SediGraph III) in a range between 5 micrometers and 45 micrometers.

3. The filler according to claim 1, wherein the filler has a bulk density in a range from 620 to 680 grams per liter.

4. The filler according to claim 1, wherein the filler has an oil absorption according to DIN EN ISO 787-5:1995-10 of less than 50 g/100 g.

5. The filler according to claim 1, wherein at least 50% of the particles of the calcinate have an edgy morphology.

6. The filler according to claim 1, wherein the particles of the calcinate have an average particle size ($d_{50}$, SediGraph III) in the range between 7 micrometers and 50 micrometers.

7. The filler according to claim 1, wherein the particles of the calcinate have an average particle size ($d_{50}$, SediGraph III) in the range between 8 micrometers and 40 micrometers.

8. The filler according to claim 1, wherein the filler has an oil absorption according to DIN EN ISO 787-5:1995-10 of less than 40 g/100 g.

9. The filler according to claim 1, wherein the filler has an oil absorption according to DIN EN ISO 787-5:1995-10 of less than 30 g/100 g.

10. The filler according to claim 1, wherein at least 75% of the particles of the calcinate have an edgy morphology and/or at least one flat surface, and wherein the proportion of an associated side surface of the respective particle is at least 30%.

11. The filler according to claim 1, wherein at least 80% of the particles of the calcinate have an edgy morphology and/or at least one flat surface, and wherein the proportion of an associated side surface of the respective particle is at least 40%.

12. The filler according to claim 1, wherein at least 90% of the particles of the calcinate have an edgy morphology and/or at least one flat surface, and wherein the proportion of an associated side surface of the respective particle is at least 50%.

13. The filler according to claim 1, wherein the particles have a packable substantially platelet-shaped geometry.

\* \* \* \* \*

UNITED STATES PATENT AND TRADEMARK OFFICE
CERTIFICATE OF CORRECTION

| | |
|---|---|
| PATENT NO. | : 11,905,436 B2 |
| APPLICATION NO. | : 16/674499 |
| DATED | : February 20, 2024 |
| INVENTOR(S) | : Klaus-Jürgen Freund, Oliver Kaltenecker and Reinhard Kräuter |

It is certified that error appears in the above-identified patent and that said Letters Patent is hereby corrected as shown below:

On the Title Page

Under item [73] on Line 1, delete "DORPNER" and insert --DORFNER-- therefore.

Signed and Sealed this
Twenty-third Day of April, 2024

Katherine Kelly Vidal
*Director of the United States Patent and Trademark Office*